WAVE-SIGNAL TRANSLATING APPARATUS
Original Filed Aug. 22, 1952
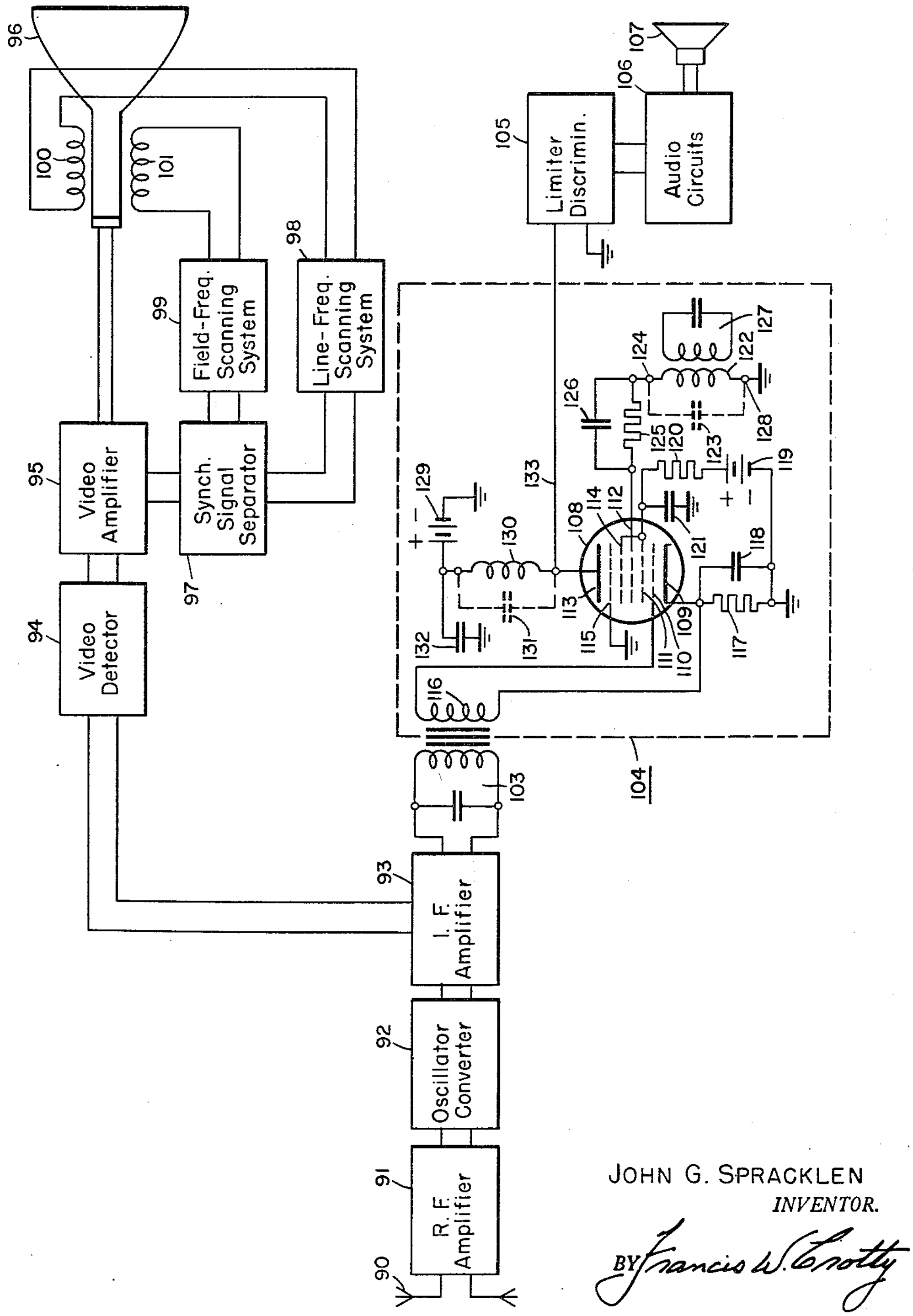
JOHN G. SPRACKLEN
INVENTOR.
BY Francis W. Crotty
HIS ATTORNEY.

United States Patent Office 2,785,300

Patented Mar. 12, 1957

2,785,300

WAVE-SIGNAL TRANSLATING APPARATUS

John G. Spracklen, Chicago, Ill., assignor to Zenith Radio Corporation, a corporation of Illinois Original application August 22, 1952, Serial No. 305,875. Divided and this application April 5, 1954, Serial No. 420,909

4 Claims. (Cl. 250—20)

This invention relates to wave-signal translating apparatus for the amplification and demodulation of modulated wave signals. This application is a division of copending application, Serial No. 305,875, filed August 22, 1952, for "Wave-Signal Translating Apparatus," and assigned to the present assignee.

In the reception of modulated wave-signals, it is conventional practice to heterodyne the incoming radio-frequency signal with a locally-generated constant-frequency signal to provide a modulated intermediate-frequency signal. The modulated intermediate-frequency signal is amplified and demodulated to provide an audio-frequency or video-frequency signal representing the modulation components of the original wave-signal, and the detected signal thus obtained is amplified and applied to a suitable utilization device such as a loudspeaker or an image-reproducing device. Conventionally, several cascaded stages are utilized to provide the desired intermediate-frequency amplification, and separate independent stages are ordinarily used to effect demodulation and subsequent amplification of the modulation components. Thus, for example, in a conventional television receiver, four cascaded stages of intermediate-frequency amplification may be used, followed by a rectifier device for video-frequency demodulation and two cascaded stages of video-frequency amplification.

It is an important object of the present invention to provide novel and improved wave-signal translating apparatus for providing in a single stage amplification of both a modulated wave-signal and the modulation components of such amplified signal after demodulation.

It is a further object of the invention to provide improved wave-signal translating apparatus for combining in a single stage the functions of modulated wave-signal amplification, demodulation, and subsequent amplification of the modulation components.

Still another object of the invention is to provide new and improved wave-signal translating apparatus for combining in a single stage the functions of two or more separate and independent stages of conventional wave-signal receivers, thereby effecting a substantial cost saving in receiver manufacture.

In accordance with the invention, the above and other objects are achieved by providing an electron-discharge device including, in the order named, a cathode, a first control grid, an accelerating anode, a second control grid, and an output electrode. A source of composite television signals, including video-modulated image-carrier and audio-modulated sound-carrier components separated by a predetermined frequency difference, is coupled to one of the control grids and to the cathode. There is also provided a two-terminal load circuit having one terminal coupled externally of the discharge device to the other control grid only and having an impedance at the image-carrier and sound-carrier frequencies greater than the reciprocal of the effective transconductance of the input control grid with respect to the other control grid for developing an amplified signal including the image-carrier and audio-modulated sound-carrier components. Means are also coupled to the other control grid and to the cathode for effecting demodulation of the amplified signal, whereby the image-carrier and the audio-modulated sound-carrier components of the amplified signal are intermodulated. Further means, including an output circuit tuned to an intercarrier frequency corresponding to the predetermined frequency difference betweent image-carrier and sound-carrier components of the composite television signal, are coupled to the output electrode and to the cathode and utilize the transconductance of the other control grid with respect to the output elecrode for developing an amplified audio-modulated intercarrier-frequency output signal. Finally, means are coupled to the output circuit for demodulating the audio-modulated output signal.

The features of the present invention which are believed to be novel are set forth with particularity in the appended claims. The invention, together with further objects and advantages thereof, may best be understood, however, by reference to the following description taken in connection with the accompanying drawing in which the single figure is a schematic diagram of a television receiver embodying novel wave-signal translating apparatus constructed in accordance with the present invention.

In the illustrated embodiment of the invention, incoming composite television signals received by an antenna 90 are applied through a radio-frequency amplifier 91 to an oscillator-converter 92. Intermediate-frequency composite television signals from oscillator-converter 92 are applied to an intermediate-frequency amplifier 93, which may consist for example of three or four cascade-connected I. F. amplifier stages. Amplifier 93 is coupled to a video detector 94, which may be of conventional construction, and the detected composite video signals from detector 94 are amplified by a video amplifier 95 and applied to the input circuit of a cathode-ray tube 96 or other image-reproducing device. Composite video signals from video amplifier 95 are also applied to a synchronizing-signal separator 97, and the line-frequency and field-frequency synchronizing-pulse components from separator 97 are employed to control line-frequency and field-frequency scanning systems 98 and 99 which, in turn, provide suitable scanning signals to line-frequency and field-frequency deflection coils 100 and 101 respectively.

Intermediate-frequency amplifier 93 is also coupled by means of output circuit 103 to wave-signal translating apparatus 104 constructed in accordance with the present invention, where the intermediate-frequency signals are further amplified and the video-carrier and sound-carrier components are intermodulated and amplified to provide an amplified audio-modulated intercarrier-frequency sound signal. This amplified intercarrier-sound signal is applied to a limiter-discriminator 105, and the resulting audio-frequency signals, after amplification in audio circuits 106, are impressed on a loudspeaker 107 or other sound-reproducing device.

The receiver may be of conventional construction with the exception of wave-signal translating apparatus 104. Apparatus 104 comprises a single electron-discharge device 108 including in the order named a cathode 109, a first control grid 110, an accelerating or screen grid 111, a second control grid 112 and an output electrode or anode 113. An additional screen grid 114 and a suppressor grid 115 may be provided between second control grid 112 and anode 113.

Intermediate-frequency composite television signals, including video-carrier and audio-modulated sound-carrier components separated by a predetermined frequency difference, are applied between first control grid 110 and cathode 109 by means of a coil 116 magnetically coupled to output circuit 103 of intermediate-frequency amplifier 93. Cathode 109 is connected to ground through a circuit comprising a resistor 117 and a condenser 118, and screen grids 111 and 114 are connected together and through a resistor 120 to the positive terminal of a battery 119 or other source of unidirectional operating potential, the negative terminal of which is grounded. Screen grids 111 and 114 are also bypassed to ground by means of condenser 121. Suppressor grid 115 is directly connected to ground.

A two-terminal load circuit, tuned to the receiver intermediate frequency and comprising an inductor 122 and an effective shunt capacity 123 which may be composed of distributed circuit and interelectrode tube capacities, has one terminal 124 coupled externally of device 108 to second control grid 112 only, through the parallel combination of a resistor 125 and a condenser 126. A parallel-resonant trap circuit 127 tuned to the intermediate frequency of the receiver may also be inductively coupled to inductor 122. The other terminal 128 of the two-terminal load circuit is coupled to cathode 109 through ground and the cathode bias circuit comprising resistor 117 and condenser 118.

Anode 113 is coupled to the positive terminal of battery 129 or other suitable source of unidirectional operating potential through an intercarrier-frequency load circuit comprising an inductor 130 shunted by an effective capacity 131 which may be composed of distributed circuit capacities. Battery 129 is bypassed to ground by means of a condenser 132. Anode 113 is also coupled to limiter-discriminator 105 by means of a lead 133.

In operation, intermediate-frequency composite video signals, including video-carrier and audio-modulated sound-carrier components, are impressed on first control grid 110. It is known in the art that whenever a low-potential control grid is placed in the path of an electron stream in a position following a high-potential accelerating electrode, a virtual cathode is produced in the vicinity of the control grid. As the intensity of the electron stream projected through the accelerating electrode is varied in accordance with an input signal, the charge density of the virtual cathode is varied in a corresponding manner, and if a suitable inductive load is connected to the low-potential control grid, an amplified replica of the input signal is induced at the control grid by space charge coupling from the input grid. This space charge coupling effect has been formally likened to a unilateral negative capacity having a magnitude of the order of a few micro-microfarads. Because it is unilateral in nature, it may be considered as providing an effective transconductance from the input grid to the low-potential control grid having a magnitude of $2\pi fC$, where $f$ is the input-signal frequency and C is the equivalent space charge coupling capacity.

In order to provide intermediate-frequency amplification between first control 110 and second control grid 112, therefore, the impedance of two-terminal load circuit, comprising inductor 122 and shunt capacity 123, at the intermediate-frequency is made greater than the reciprocal of the effective transconductance, at the intermediate-frequency, of first control grid 110 with respect to second control grid 112. Since amplification may be computed as the product of the effective transconductance and the load impedance, as is well known in the art, amplification or gain greater than unity is thus achieved. In practice, ratios of load impedance to reciprocal effective transconductance much greater than unity are preferred; for example, ratios of 10 or more have been employed with eminent success.

Inductor 122 and effective shunt capacity 123 are tuned to the intermediate frequency to provide the requisite impedance at the frequencies of the carrier components for intermediate-frequency amplification. Consequently, the video-carrier and sound-carrier components appear in amplified form at second control grid 112 by virtue of space charge coupling from first control grid 110 to second control grid 112. Trap circuit 127, also tuned to the intermediate frequency, may be provided for the purpose of emphasizing the carrier components by providing a double-peaked impedance characteristic for the two-terminal load circuit coupled to second control grid 112.

Second control grid 112 is biased to a non-linear portion of its dynamic transfer characteristic by means coupled to second control electrode 112 and to cathode 109. In the illustrated embodiment, this operating bias is provided by cathode resistor 117 and condenser 118 and further by resistor 125 and condenser 126 connected in the return path from second control grid 112 to ground; however, it may be possible by judicious design of the tube to operate second control grid 112 at zero bias, in which event the biasing means may consist of a direct connection between terminal 128 and cathode 109. Consequently, the video-carrier and audio-modulated sound-carrier components of the amplified signal appearing at second control grid 112 are subjected to anode-bend detection and are intermodulated by device 108 to provide an audio-modulated signal having a carrier frequency corresponding to the frequency separation between the video-carrier and sound-carrier components. Load circuit 130, 131 is tuned to the intercarrier frequency, and amplified intercarrier sound signals are developed at anode 113 by virtue of the transconductance characteristic of second control grid 112 with respect to anode 113. These intercarrier signals, bearing the audio modulation, are applied to limiter-discriminator 105 where they are detected to provide audio-frequency signals which are applied, after suitable amplification, to loudspeaker 107.

Resistor 125 and condenser 126, having a time constant which is short with respect to the highest-audio-frequency components, are preferably included in the circuit from second control grid 112 to cathode 109. Resistor-condenser network 125, 126 provides an automatic variation in the bias of second control grid 112 in accordance with the audio-frequency modulation components, thus tending to prevent the amplified intermediate-frequency signals from driving the second control grid beyond its linear operating range and thus avoiding undesirable modulation of the intercarrier sound signals by changes in picture carrier level in accordance with the video and synchronizing components.

In the illustrated embodiment of the invention, amplification of the modulated-carrier input signals is accomplished by virtue of space charge coupling between two control grids separated by an accelerating electrode. Means associated with the second control grid are provided for effecting demodulation of the amplified replica of the input signal and for modulating the electron flow to the output electrode of the tube in accordance with modulation components of the amplified replica. These modulation components are then amplified by virtue of the transconductance of the second control grid with respect to the final anode or output electrode. The post-detection gain is proportional to the transconductance of the second control grid with respect to the anode. If desired, a separate rectifier may be employed for detection, in the manner described in application Serial No. 305,875, in which event the overall conversion gain is proportional to the transconductance or first derivative of anode current with respect to second-control-grid voltage at the operating point; in embodiments employing anode-bend detection at the second control grid, the overall conversion gain is proportional to the first derivative of that transconductance or second derivative of anode current with respect to second-control-grid voltage, which is a measure of the degree of non-linearity of the dynamic transfer characteristic at the operating point.

Thus, the invention provides new and improved wave-signal translating apparatus for effectively accomplishing in a single stage the several functions of input-signal amplification, demodulation, and subsequent amplification of the modulation components. While the invention has been shown and described in the environment of a television receiver, it may also be used to advantage in other types of modulated wave-signal translating apparatus such as ultra-high frequency amplitude-modulation receivers. However, since the invention is dependent on the advantageous use of the space charge coupling effect, which is of useful magnitude only at relatively high frequencies, its utility is limited to applications at frequencies of the order of 1 megacycle or higher.

While a particular embodiment of the present invention has been shown and described, it is apparent that numerous variations and modifications may be made, and it is therefore contemplated in the appended claims to cover all such variations and modifications as fall within the true spirit and scope of the invention.

I claim:

1. Wave-signal translating apparatus comprising: an electron-discharge device including, in the order named, a cathode, a first control grid, an accelerating electrode, a second control grid and an output electrode; a source of composite television signals, including video-modulated image-carrier and audio-modulated sound-carrier components separated by a predetermined frequency difference, coupled to one of said control grids and to said cathode; a two-terminal load circuit having one terminal coupled externally of said device to the other of said control grids only and having an impedance at the frequencies of said image-carrier and said audio-modulated sound-carrier components greater than the reciprocal of the effective transconductance, at said frequencies, of said one control grid with respect to said other control grid for developing an amplified signal including said carrier components; means coupled to said other control grid and to said cathode for effecting demodulation of said amplified signal, whereby said image-carrier and said audio-modulated sound-carried components of said amplified signal are intermodulated; means, including an output circuit tuned to an intercarrier frequency corresponding to said predetermined frequency difference, coupled to said output electrode and to said cathode and utilizing the transconductance of said other control grid with respect to said output electrode for developing an amplified audio-modulated intercarrier-frequency output signal and means coupled to said output circuit for demodulating said audio-modulated output signal.

2. Wave-signal translating apparatus comprising: an electron-discharge device including, in the order named, a cathode, a first control grid, an accelerating electrode, a second control grid, and an output electrode; a source of composite television signals, including video-modulated image-carrier and audio-modulated sound-carrier components separated by a predetermined frequency difference, coupled to said first control grid and to said cathode; a two-terminal load circuit having one terminal coupled externally of said device to said second control grid only and having an impedance at the frequencies of said image-carrier and said audio-modulated sound-carrier components greater than the reciprocal of the effective transconductance, at said frequencies, of said first control grid with respect to said second control grid for developing an amplified signal including said carrier components; means coupled to said second control grid and to said cathode for effecting demodulation of said amplified signal, whereby said image-carrier and said audio-modulated sound-carrier components of said amplified signal are intermodulated; means, including an output circuit tuned to an intercarrier frequency corresponding to said predetermined frequency difference, coupled to said output electrode and to said cathode and utilizing the transconductance of said second control grid with respect to said output electrode for developing an amplified audio-modulated intercarrier-frequency output signal and means coupled to said output circuit for demodulating said audio-modulated output signal.

3. Wave-signal translating apparatus comprising: an electron-discharge device including, in the order named, a cathode, a first control grid, an accelerating electrode, a second control grid, and an output electrode; a source of composite television signals, including video-modulated image-carrier and audio-modulated sound-carrier components separated by a predetermined frequency difference, coupled to said first control grid and to said cathode; a two-terminal load circuit having one terminal coupled externally of said device to said second control grid only and having an impedance at the frequencies of said image-carrier and said audio-modulated sound-carrier components greater than the reciprocal of the effective transconductance, at such frequencies, of said first control grid with respect to said second control grid for developing an amplified signal including said carrier components; means coupled to said second control grid and to said cathode for biasing said second control grid to a non-linear portion of its dynamic transfer characteristic, whereby said image-carrier and said audio-modulated sound-carrier components of said amplified signal are intermodulated by said device; means, including an output circuit tuned to an intercarrier frequency corresponding to said predetermined frequency difference, coupled to said output electrode and to said cathode and utilizing the transconductance of said second control grid with respect to said output electrode for developing an amplified audio-modulated intercarrier-frequency output signal and means coupled to said output circuit for demodulating said audio-modulated output signal.

4. Wave-signal translating apparatus comprising: an electron-discharge device including, in the order named, a cathode, a first control grid, an accelerating electrode, a second control grid and an output electrode; a source of composite television signals, including video-modulated image-carrier and audio-modulated sound-carrier components separated by a predetermined frequency difference, coupled to one of said control grids and to said cathode; a double-tuned two-terminal load circuit exhibiting a double-peaked impedance characteristic having one terminal coupled externally of said device to the other of said control grids only and having an impedance at the frequencies of said image-carrier and said audio-modulated sound-carrier components greater than the reciprocal of the effective transconductance, at said frequencies, of said one control grid with respect to said other control grid for developing an amplified signal including said carrier components; means coupled to said other control grid and to said cathode for effecting demodulation of said amplified signal, whereby said image-carrier and said audio-modulated sound-carrier components of said amplified signal are intermodulated; means, including an output circuit tuned to an intercarrier frequency corresponding to said predetermined frequency difference, coupled to said output electrode and to said cathode and utilizing the transconductance of said other control grid with respect to said output electrode for developing an amplified audio-modulated intercarrier-frequency output signal and means coupled to said output circuit for demodulating said audio-modulated output signal.

References Cited in the file of this patent

UNITED STATES PATENTS 2,616,036 Adler ------------------- Oct. 28, 1952